United States Patent
Cui et al.

(10) Patent No.: US 12,104,008 B2
(45) Date of Patent: Oct. 1, 2024

(54) SOLID-SOLID PHASE-CHANGE MATERIALS

(71) Applicant: STEPAN COMPANY, Northfield, IL (US)

(72) Inventors: Zhenhua Cui, Glenview, IL (US); Warren A. Kaplan, Libertyville, IL (US); Sarah Wolek, Arlington Heights, IL (US)

(73) Assignee: STEPAN COMPANY, Northfield, IL (US)

( * ) Notice: Subject to any disclaimer, the term of this patent is extended or adjusted under 35 U.S.C. 154(b) by 1084 days.

(21) Appl. No.: 16/994,220

(22) Filed: Aug. 14, 2020

(65) Prior Publication Data

US 2020/0377646 A1    Dec. 3, 2020

Related U.S. Application Data

(63) Continuation of application No. PCT/US2019/018688, filed on Feb. 20, 2019.

(60) Provisional application No. 62/634,396, filed on Feb. 23, 2018.

(51) Int. Cl.
| | |
|---|---|
| *C08G 59/06* | (2006.01) |
| *C08G 18/42* | (2006.01) |
| *C08G 18/48* | (2006.01) |
| *C08G 59/14* | (2006.01) |
| *C08G 63/06* | (2006.01) |
| *C08G 65/331* | (2006.01) |
| *C08G 65/34* | (2006.01) |
| *C08J 9/00* | (2006.01) |
| *C09K 5/14* | (2006.01) |

(52) U.S. Cl.
CPC ....... *C08G 59/063* (2013.01); *C08G 18/4294* (2013.01); *C08G 18/4895* (2013.01); *C08G 59/14* (2013.01); *C08G 63/06* (2013.01); *C08G 65/331* (2013.01); *C08G 65/34* (2013.01); *C08J 9/0009* (2013.01); *C09K 5/14* (2013.01); *C08G 2110/0008* (2021.01); *C08G 2110/0025* (2021.01); *C08G 2115/02* (2021.01); *C08J 2205/10* (2013.01); *C08J 2375/06* (2013.01); *C08J 2375/08* (2013.01); *Y02E 60/14* (2013.01)

(58) Field of Classification Search
CPC ...... C08G 59/063; C08G 63/06; C08G 65/34; C08G 2110/0008; C08G 2110/0025; C08G 2115/02; C08G 18/4294; C08G 18/4895; C08G 59/14; C08G 65/331; C08J 9/0009; C08J 2205/10; C08J 2375/06; C08J 2375/08; Y02E 60/14; C09K 5/14

See application file for complete search history.

(56) References Cited

U.S. PATENT DOCUMENTS

| | | | |
|---|---|---|---|
| 5,066,685 | A | 11/1991 | Hanak |
| 2013/0296449 | A1 | 11/2013 | Peterson et al. |
| 2014/0319410 | A1 | 10/2014 | Sawafta et al. |
| 2016/0024366 | A1 | 1/2016 | Iwamura et al. |
| 2017/0072604 | A1 | 3/2017 | Sjong |

FOREIGN PATENT DOCUMENTS

| | | | |
|---|---|---|---|
| CN | 1247216 | A | 3/2000 |
| CN | 1245451 | C | 3/2006 |
| CN | 1914274 | A | 2/2007 |
| CN | 101230256 | A * | 7/2008 |
| CN | 101760120 | A | 6/2010 |
| CN | 101831045 | A | 9/2010 |
| CN | 102634163 | A | 8/2012 |
| CN | 104710732 | A | 6/2015 |
| CN | 105073918 | A | 11/2015 |
| EP | 1378540 | A1 | 1/2004 |
| EP | 1621565 | A1 | 2/2006 |
| WO | 2004085509 | A1 | 10/2004 |

OTHER PUBLICATIONS

International Search Report issued in International Application No. PCT/US2019/018688, dated May 24, 2019, 2 pages.
Office Action issued in Chinese Aplication No. 201980014983.5. Issued May 6, 2021. 11 pages.
Bo Wu, et al., Study on a PEG/epoxy shape-stabilized phase change material: Preparation, thermal properties and thermal storage performance, International Journal of Heat and Mass Transfer, vol. 126, Part B, 2018, pp. 1134-1142 (Abstract Only).
Swati Sundararajan, et al., Poly(ethylene glycol) (PEG)-modified epoxy phase-change polymer with dual properties of thermal storage and vibration damping, Sustainable Energy Fuels, 2018, 2, 688-697.

* cited by examiner

*Primary Examiner* — Rabon A Sergent
(74) *Attorney, Agent, or Firm* — DILWORTH IP, LLC

(57) ABSTRACT

Polyether- or polyester-epoxide polymer (PEEP) compositions are disclosed. The compositions comprise reaction products of a polyepoxide compound and a polyol composition. The polyol composition has a melting point within the range of 20° C. to 100° C. and a hydroxyl number less than 35 mg KOH/g. The PEEP composition is a solid-solid phase-change material. As measured by differential scanning calorimetry (DSC) at a heating/cooling rate of 10° C./minute, the PEEP composition has a transition temperature within the range of −10° C. to 70° C., a latent heat at the transition temperature within the range of 30 to 200 J/g, and little or no detectable hysteresis or supercooling upon thermal cycling over at least five heating/cooling cycles that encompass the transition temperature. The PEEP compositions should enable formulators to manage thermal energy changes in many practical applications, including automotive, marine or aircraft parts, building materials, appliance insulation, electronics, textiles, garments, and paints or coatings.

18 Claims, 1 Drawing Sheet

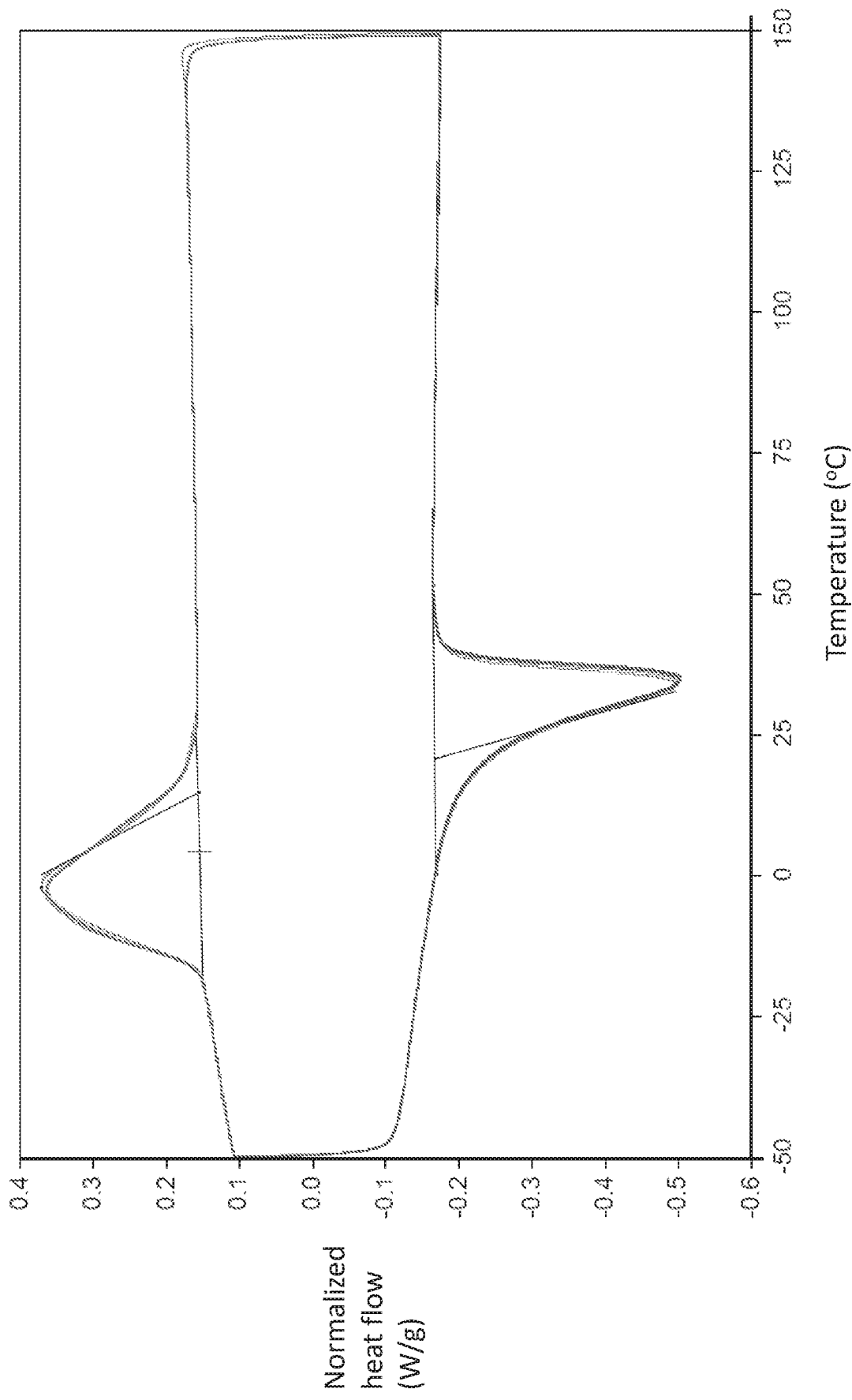

SOLID-SOLID PHASE-CHANGE MATERIALS

FIELD OF THE INVENTION

The invention relates to phase-change materials, and in particular, to solid-solid phase-change materials based on polyol-epoxide polymer compositions.

BACKGROUND OF THE INVENTION

Phase-change materials ("PCM") are capable of storing or releasing large amounts of energy at a characteristic temperature, which typically corresponds to a phase change, such as a solid-to-liquid transformation. PCMs are used, for instance, in thermal energy storage applications, building construction, transportation of medicines, off-peak power utilization, computer cooling, and clothing textiles. Common PCMs include paraffins, fatty acids and esters, inorganic salt hydrates, and hygroscopic materials (see, e.g., U.S. Publ. No. 2013/0296449 at Table 1).

Solid-liquid PCMs, although widely used, have limited applicability. They need packaging capable of retaining a liquid phase, may need to release water (e.g., from a hydrated salt), may lose mass after hundreds of melting and solidification cycles, and may be flammable (e.g., paraffins). Many of these materials also exhibit other aging effects, so their differential scanning calorimetry (DSC) curves lack symmetry and/or reproducibility from one cycle to the next.

Solid-solid PCMs ("ssPCM") have the potential to avoid some of the problems of solid-liquid PCMs. Desirably, a change in crystallinity or other phase transition can have the latent heat advantages of PCMs without losing dimensional integrity. When the ambient temperature exceeds the transition temperature of the PCM, the PCM absorbs heat and stores the thermal energy. When the ambient temperature drops below the transition temperature of the PCM, energy is released back to the environment. In a ssPCM, the solid undergoes a transition while transforming from one solid phase (e.g., a rigid article) to another solid phase (e.g., a flexible solid) thereby avoiding the need for packaging or encapsulation. The ability to absorb and release heat without changing from a solid to a liquid phase or changing shape is especially important for producing energy-efficient appliances, improved building materials (e.g., rigid foam insulation, panels, spray foams, and laminates), electronics that will not overheat, and comfortable outerwear. Unfortunately, most ssPCMs suffer from one or more drawbacks, including solubility in polyols or other reactants, supercooling, extractability, water solubility, flammability, material loss, or low thermal stability.

Recently, we developed new classes of polyether/polyester-epoxide polymers ("polyether PEEPs" and "polyester PEEPs"). The polyether PEEPs are reaction products of a polyepoxide compound and a polyol composition comprising a polyether polyol. The polyether polyols have a hydroxyl value within the range of 150 to 800 mg KOH/g and an average hydroxyl functionality within the range of 3.5 to 8.0. The polyester PEEPs are reaction products of a polyepoxide compound and a polyester polyol composition. The polyester polyol has a hydroxyl value within the range of 50 to 400 mg KOH/g and an average hydroxyl functionality within the range of 1.5 to 4.0. The polyester-epoxide compositions retain many of the benefits of traditional epoxy resin-based products, but they have increased elongation and lower $T_g$. Both varieties of PEEP compositions are useful for coatings, elastomers, adhesives, sealants, and other valuable products and can be made without reliance on polyamines or polyisocyanates.

In general, the PEEP materials described previously are not ideal phase-change materials. However, our success in making new classes of polymers with tunable properties encouraged us to look for ways to extend PEEP technology to produce desirable PCMs.

The industry would benefit from the availability of additional epoxy-based products having desirable attributes of solid-solid phase-change materials. Desirably, the products could be made using commercially available or readily made starting materials, conventional equipment, and ordinary process conditions. Preferably, the products could be tailored to meet targets considered valuable for PCMs, including phase-change temperatures at or near room temperature, relatively high latent heat values, chemical resistance, good thermal stability, and little or no supercooling effect when subjected to thermal cycling. Ideally, the new PCMs would enable the production of energy-conserving building products, improved products for thermal management in electronics and other applications, and comfortable fabrics and garments.

SUMMARY OF THE INVENTION

In one aspect, the invention relates to a polyether- or polyester-epoxide polymer (PEEP) composition. The PEEP composition comprises a reaction product of a polyepoxide compound and a polyol composition. The polyepoxide compound has an equivalent weight within the range of 115 to 250 g/eq. The polyol composition comprises a polyether polyol, a polyester polyol, or a mixture thereof. The polyol composition has a melting point within the range of 20° C. to 100° C. and a hydroxyl number less than 35 mg KOH/g. In the PEEP composition, the ratio of epoxy equivalents of the polyepoxide compound to hydroxyl equivalents of the polyol composition is within the range of 2:1 to 6:1. The PEEP composition is a solid-solid phase-change material. As measured by differential scanning calorimetry (DSC) at a heating/cooling rate of 10° C./minute, the PEEP composition has a transition temperature within the range of −10° C. to 70° C., a latent heat at the transition temperature within the range of 30 to 200 J/g, and little or no detectable hysteresis or supercooling upon thermal cycling over at least five heating/cooling cycles that encompass the transition temperature.

In other aspects, the invention includes products that use the PEEP compositions, such as automotive or building products, electronics, rigid polyurethane or polyisocyanurate foams and appliances that incorporate them, composite materials comprising one or more layers of the PEEP compositions, flexible polyurethane foams, textiles or garments comprising the PEEP compositions, and paints and coatings.

We surprisingly found that particular polyether polyol or polyester polyol compositions having melting points within the range of 20° C. to 100° C. and hydroxyl numbers less than 35 mg KOH/g can deliver PEEP compositions having desirable attributes as solid-solid phase-change materials. The PEEP compositions should offer users of PCMs enhanced flexibility in formulating new products, including building materials, parts for vehicles, products for thermal management in electronics and other applications, and fabrics or garments.

BRIEF DESCRIPTION OF THE DRAWINGS

FIG. 1 is a differential scanning calorimetry (DSC) plot of normalized heat flow (W/g) versus temperature for five consecutive and complete cycles of heating and cooling for a PEEP composition of the invention.

DETAILED DESCRIPTION OF THE INVENTION

Polyether- or polyester-epoxide polymer (PEEP) compositions comprise a reaction product of a polyepoxide compound and a polyol composition.

The Polyepoxide Compound

Suitable polyepoxide compounds have two or more epoxide groups per molecule and an equivalent weight within the range of 115 to 250 g/eq., or in some aspects 125 to 240 g/eq. or 150 to 235 g/eq.

In preferred aspects, the polyepoxide compounds have an average of 2 to 4 epoxide groups per molecule ("average epoxide functionality"). In some aspects, the average epoxide functionality is from 2 to 3, 2.0 to 2.8, or about 2.

Some suitable polyepoxide compounds are commercially available, while others are readily synthesized from the reaction of epichlorohydrin and a suitable polyol or polyamine precursor, preferably from epichlorohydrin and an aromatic, aliphatic, or cycloaliphatic polyol or polyamine.

In some aspects, the polyepoxide compound is a reaction product of a bisphenol (e.g., bisphenol A, bisphenol AP, bisphenol BP, bisphenol C, bisphenol F, bisphenol S, bisphenol Z, or the like) and epichlorohydrin. In other aspects, the polyepoxide compound is the reaction product of a hydrogenated bisphenol and epichlorohydrin. In other words, in some cases the polyepoxide compound is a "diglycidyl ether" of the bisphenol or hydrogenated bisphenol. Many of these materials are commercially available. For instance, suitable polyepoxide compounds include the EPON® 800 series of epoxy resins (products of Hexion Specialty Chemicals), mostly from bisphenol A or bisphenol F, such as EPON® resins 825, 826, 828, 830, 834, 862, and the like. Suitable bisphenol F-based resins also include EPALLOY® 8220, EPALLOY® 8230, and EPALLOY® 8240, products of CVC Thermoset Specialties.

Suitable epoxide compounds include bisphenol diglycidyl ethers in which the aromatic rings have been hydrogenated, such as EPALLOY® 5000 and EPALLOY® 5001, or modified with alkyl or functional groups, such as EPALLOY® 7200. Suitable polyepoxide compounds include di-, tri-, or tetrafunctional aromatic polyepoxides such as those available from CVC Thermoset Specialties: resorcinol diglycidyl ether (ERISYS™ RDGE), tris(hydroxyphenyl)ethane triglycidyl ether (EPALLOY® 9000), trimethylolpropane triglycidyl ether (ERISYS™ GE-30), resorcinol/phenol novolac epoxy resins (e.g., ERISYS™ RN-3650), other epoxy novolac resins (e.g., EPALLOY® 8280), and m-xylenediamine tetraglycidyl ether (ERISYS™ GA 240). Suitable polyepoxide compounds also include aromatic, aliphatic, and cycloaliphatic glycidyl esters, such as the diglycidyl ester of isophthalic acid, phthalic acid, or terephthalic acid and hydrogenated versions thereof, such as hexahydrophthalic acid diglycidyl ester (available, for instance, as EPALLOY® 5200).

In some aspects, the polyepoxide compound is an aliphatic diglycidyl ether, particularly aliphatic diglycidyl ethers having average epoxide functionalities of at least 2, preferably at least 3. Suitable aliphatic diglycidyl ethers include, for example, 1,4-butanediol diglycidyl ether, 1,4-cyclohexanediol diglycidyl ether, neopentyl glycol diglycidyl ether, ethylene glycol diglycidyl ether, 2-methyl-1,3-propanediol diglycidyl ether, 1,6-hexanediol diglycidyl ether, dipropylene glycol diglycidyl ether, glycerol triglycidyl ether, trimethylolpropane triglycidyl ether, pentaerythritol tetraglycidyl ether, and the like, and mixtures thereof. Suitable polyepoxide compounds of this type are easily made by reacting the polyols with excess epichlorohydrin; several are commercially available from CVC Thermoset Specialties (e.g., ERISYS™ GE-21 and ERISYS™ EGDGE) or from other suppliers.

Mixtures of various types of polyepoxide compounds can be used. Suitable compositions can be made using aromatic polyepoxide compounds only (e.g. EPON® 828), aliphatic polyepoxide compounds only (e.g., ERISYS™ GE-30), or some combination thereof.

The polyepoxide compound is used in an amount such that the ratio of epoxy equivalents of the polyepoxide compound to hydroxyl equivalents of the polyol composition comprising a polyether polyol, polyester polyol, or mixture thereof (also described herein as the "epoxy/OH eq. ratio") is within the range of 2:1 to 6:1. In other aspects, the ratio of epoxy to hydroxyl equivalents will range from 2.5:1 to 5.5:1, or from 3:1 to 5:1.

The amount of polyepoxide compound used can vary and will depend on many factors, including the nature of the polyepoxide compound, the nature and proportion of the polyol composition, the desired stoichiometry, and other factors. In general, however, the amount of polyepoxide compound will be within the range of 5 to 30 wt. %, 8 to 25 wt. %, or 10 to 20 wt. %, based on the amount of PEEP composition.

The Polyol Composition

The PEEP composition comprises a reaction product of the polyepoxide compound and a polyol composition. The polyol composition comprises a polyether polyol, a polyester polyol, or a mixture thereof. Suitable polyol compositions have (not including any other non-polyol components such as catalysts or diluents) a melting point within the range of 20° C. to 100° C., preferably from 30° C. to 65° C., and a hydroxyl number less than 35 mg KOH/g, preferably from 10 to 30 mg KOH/g. In some aspects, the polyol compositions will have average hydroxyl functionalities within the range of 1.5 to 4.0, preferably 1.8 to 3.0, more preferably 1.9 to 2.1 or about 2.0.

Suitable polyether polyols will generally have a melting point within the range of 20° C. to 100° C. and a hydroxyl number less than 35 mg KOH/g. Suitable polyether polyols can be synthesized by ring-opening polymerization of ethylene oxide, propylene oxide, butylene oxides, tetrahydrofuran, or mixtures thereof, in the presence of hydroxy- and/or amine-functional initiators. In some cases, the reactions are catalyzed by bases (e.g., KOH), transition metal catalysts (e.g., double metal cyanide catalysts), Lewis acids (e.g., $BF_3$ catalysts) or the like. A variety of diols, triols, and higher functionality initiators can be used alone or in combination to give an average hydroxyl functionality within the range of 1.5 to 4.0. Linear polyether polyols, especially polyethylene glycols having number average molecular weights from 3,000 to 10,000 g/mol or from 4,000 to 8,000 g/mol, are preferred.

Suitable polyether polyols are commercially available. Examples include CARBOWAX® polyethylene glycols from Dow Chemical and similar products supplied by Sigma-Aldrich and others. Polyethylene glycols are particularly preferred.

Suitable polyester polyols will also generally have a melting point within the range of 20° C. to 100° C. and a hydroxyl number less than 35 mg KOH/g. Suitable polyester polyols are well known and include aromatic and aliphatic polyester polyols. Aliphatic polyester polyols, especially linear aliphatic polyester polyols, are preferred. The polyester polyols are terminated with hydroxyl groups and generally have low acid numbers (i.e., below 5 mg KOH/g). Suitable polyester polyols are readily synthesized by condensation polymerization of dicarboxylic acids, esters, or anhydrides with low molecular weight diols, polyols, or their mixtures. Suitable dicarboxylic acids, esters, or anhydrides include, for example, phthalic anhydride, isophthalic acid, terephthalic acid, dimethyl terephthalate, trimellitic anhydride, maleic anhydride, succinic anhydride, succinic acid, dimethyl succinate, diethyl adipate, glutaric acid, adipic acid, sebacic acid, suberic acid, and the like, and combinations thereof. Suitable diols and polyols useful for making polyester polyols include, for example, ethylene glycol, propylene glycol, 2-methyl-1,3-propanediol, 1,4-butanediol, 1,6-hexanediol, diethylene glycol, dipropylene glycol, triethylene glycol, tripropylene glycol, neopentyl glycol, 1,4-cyclohexanedimethanol, glycerin, trimethylolpropane, trimethylolethane, pentaerythritol, and the like, and combinations thereof. Diols are preferred. Particularly preferred polyester polyols are 1,6-hexanediol adipates having hydroxyl numbers within the range of 10 to 35 mg KOH/g.

Suitable polyester polyols for use herein are commercially available from Stepan Company and other polyol suppliers. Examples include the STEPANPOL® PC-series of polyols, products of Stepan. Particular examples include STEPANPOL® PC-5000P-30, STEPANPOL® PC-5010P-35, STEPANPOL® PC-1015-35, STEPANPOL® PC-102P-34, STEPANPOL® PC-105-10, STEPANPOL® PC-105P-30, STEPANPOL® PC-205P-17, STEPANPOL® PC-205P-20, STEPANPOL® PC-205P-35, and STEPANPOL® PC-2072P-30. Other commercially available products include TERATE® and TERRIN™ polyols from INVISTA, TEROL® polyols from Huntsman, LUPRAPHEN® polyols from BASF, DESMOPHEN® polyols from Covestro, FOMREZ® polyols from LANXESS, and DIEXTER™ polyols from Coim.

Preferred polyester polyols will have a limited proportion of carboxylic acid end groups and a correspondingly low acid number, i.e., less than 5 mg KOH/g. In some aspects, the polyester polyol will have an acid number less than 3 mg KOH/g, less than 2 mg KOH/g, or less than 1 mg KOH/g.

The polyol composition can include polycarbonate polyols, or other kinds of polyols in addition to the polyether polyol, polyester polyol, or mixture thereof provided that the overall polyol composition has the required melting point range of 20° C. to 100° C. and hydroxyl number less than 35 mg KOH/g. In general, the polyol composition comprises at least 50 mole %, in some aspects at least 60 mole %, or at least 80 mole %, of one or more polyether polyols, polyester polyols, or a mixture thereof. In some aspects, the polyol composition will consist of or consist essentially of one or more polyether polyols, polyester polyols, or a mixture thereof.

As indicated earlier, the amount of polyol composition used will be an amount effective to give a ratio of epoxy equivalents of the polyepoxide compound to hydroxyl equivalents of the polyol composition (i.e., an epoxy/OH eq. ratio) within the range of 2:1 to 6:1, 2.5:1 to 5.5:1, or from 3:1 to 5:1.

The amount of polyol composition used can vary and will depend on many factors, including the nature and amount of the polyepoxide compound, the nature of the polyol composition, the desired stoichiometry, and other factors. In general, however, the amount of polyol composition will be within the range of 70 to 95 wt. %, 75 to 92 wt. %, or 80 to 90 wt. %, based on the amount of PEEP composition.

Polyol-Epoxide Polymer (PEEP) Compositions

The reaction product of the polyepoxide compound and the polyol composition comprising a polyether polyol, a polyester polyol, or a mixture thereof is a polyol-epoxide polymer (PEEP) composition. The PEEP compositions described herein are useful as solid-solid phase-change materials (ssPCM). In particular, the PEEP compositions have characteristic properties when evaluated using differential scanning calorimetry (DSC).

First, the PEEP compositions have a transition temperature as measured by DSC at a heating/cooling rate of 10° C./minute within the range of −10° C. to 70° C., or from 15° C. to 50° C., or from 20° C. to 40° C. By "transition temperature," we mean a specific temperature or temperature range within which the PEEP composition undergoes a morphological change from one solid form to a different solid form. The transition may or may not involve a change in crystallinity of the polymer, a "loosening" of polymer chains, and/or a change in physical nature of the material (e.g., from a rigid solid to a more flexible one). Regardless of what is taking place on a molecular level, the transition coincides with a characteristic absorption or release of heat at a particular temperature or within a particular temperature range. On a DSC trace, the transition temperature can be estimated as a temperature or temperature range between the temperature observed at maximum heat absorption and the temperature observed at maximum heat release.

Second, the PEEP compositions have relatively high latent heats at the transition temperature that are within the range of 30 to 200 J/g, 35 to 150 J/g, or 40 to 100 J/g. The high latent heat property allows the compositions to function well as phase-change materials.

Third, the PEEP compositions exhibit little or no detectable hysteresis or supercooling upon thermal cycling over at least five heating/cooling cycles that encompass the transition temperature. In this context, "supercooling" has its traditional meaning: supercooling occurs when a liquid or gas cools to a temperature below its freezing point without solidifying. In some aspects, the little or no detectable hysteresis or supercooling is evidenced by a total change in latent heat in any heating or cooling transition of less than 5% over at least five cycles, or preferably at least ten, fifty, or one hundred cycles. In other aspects, the little or no detectable hysteresis or supercooling is evidenced by a variation in transition temperature in any heating or cooling transition of less than 2° C. over at least five cycles, or preferably at least ten, fifty, or one hundred cycles. In still other aspects, the little or no detectable hysteresis or supercooling is evidenced by DSC traces obtained at a heating/cooling rate of 10° C./minute that are substantially superimposable over at least five cycles, or preferably at least ten, fifty, or one hundred cycles.

FIG. 1 illustrates a DSC trace plotting normalized heat flow (W/g) versus temperature (° C.) at a heating/cooling rate of 10° C./minute for five cycles of an inventive PEEP composition, in this case from Example 2, a reaction product of PEG 8000 and EPON® 828. Heat release (exotherm) is indicated by an increase in heat flow, while heat absorption (endotherm) is indicated by a decrease in heat flow. The plot demonstrates little or no detectable hysteresis or supercooling with traces that are substantially superimposable. In the upper (cooling) region, the onset temperature for the transition is about 14.8° C., the peak heat release temperature is about −2.2° C., and the normalized enthalpy is about 51.7 J/g. In the lower (heating) region, the onset temperature for the transition is about 20.8° C., the peak heat absorption temperature is about 34.0° C., and the normalized enthalpy is 50.4 J/g. The transition temperature for this material is about 16° C., i.e., a value intermediate between the peak temperatures. Results are very consistent through the five complete cycles shown in the FIGURE. The substantial enthalpy value, the temperature change close to room temperature, and the absence of supercooling suggest that this PEEP composition has favorable phase-change properties for many practical applications.

The PEEP compositions can include additives such as surfactants, fillers, pigments, flame retardants, catalysts, viscosity modifiers, blowing agents, reactive or non-reactive diluents, and the like. The type and amount of additive used will depend on the requirements of the specific end-use application.

The PEEP compositions can be formulated as or into elastomers, microcellular elastomers, coatings, sealants, adhesives, flexible foams, rigid foams, and other products.

Applications

The PEEP compositions are particularly valuable in applications that benefit from inclusion of a solid-solid phase-change material (ssPCM). The compositions should prove valuable for use in managing thermal energy changes.

The PEEP compositions should be useful in automotive, marine, or aeronautical applications such as wire-and-cable coverings, flexible or rigid foams or elastomers used in headliners, seat cushions, dashboards, interior insulation, and similar applications.

The PEEP compositions can be used to manage heat transfer in building products, especially polyurethane and polyisocyanurate rigid foam insulation, wallboard, ceiling panels, masonry, cement, brickwork, stucco, polystyrenics, foamed polyolefins, and the like.

The PEEP compositions should also be valuable for use in foams used to insulate appliances, including refrigerators, freezers, dishwashers, water heaters, or the like. The PEEP compositions can be used in particulate or granular form.

In some aspects, the PEEP compositions may be used as one or more layers to manage thermal energy changes in a composite structure with other materials such as polyurethane or polyisocyanurate foams.

PEEP compositions can be used to improve thermal resistance and comfort in fabrics (e.g., for curtains) or in garments (e.g., jackets, headcovers, or pants).

In other aspects, the PEEP compositions can be used to produce paints or coatings that help to manage both heating and cooling costs, especially for buildings located in very warm or very cold climates, and advantageously in climates with widely variable temperature changes.

In other aspects, the PEEP compositions can be used to manage thermal energy gradients in electronic parts or devices, including circuit boards, tablets, laptops, desktops, cell phones, televisions, stereos, game systems, servers, and the like. Electronic devices frequently require ways to dissipate heat from batteries, central processing units, graphics processing units, or other heat-generating components. The PEEP compositions may also have utility for redistributing heat in data storage centers or server farms, particularly where these systems are integrated with HVAC equipment.

Processes for Making PEEP Compositions

1. Low-Temperature (0° C. to 40° C.) Process

The PEEP compositions can be produced in a single reaction step, preferably under ambient conditions. The process comprises reacting at a temperature within the range of 0° C. to 40° C., in the presence of a catalyst, a mixture comprising a polyepoxide compound and a polyol composition.

Preferred catalysts comprise a Lewis acid compound. Suitable Lewis acid compounds are electron pair acceptors and include, for example, aluminum chloride, aluminum bromide, zinc chloride, boron trichloride, boron trifluoride, tin tetrachloride, antimony pentachloride, and the like. Boron trifluoride and especially complexes of boron trifluoride with electron donors (e.g., ethers, alcohols, carboxylic acids, polyols, amines, sulfides) are preferred Lewis acid compounds. Examples include boron trifluoride etherate, boron trifluoride tetrahydrofuran complexes, boron trifluoride/alcohol complexes, boron trifluoride/acetic acid complexes, boron trifluoride/phosphoric acid complexes, boron trifluoride dimethyl sulfide complexes, boron trifluoride amine complexes, boron trifluoride polyol complexes, and the like, and combinations thereof. Lewis acid complexes with ethers, alcohols, polyols, and amines are particularly preferred. Suitable catalysts include, for instance, LEECURE® B-610 and LEECURE® B-1310, complexes of boron trifluoride with a Lewis base, products of Leepoxy Plastics, Inc.

In other aspects, the low-temperature process is performed in the presence of a base catalyst. Amine catalysts are preferred. In some preferred aspects, the amine catalyst comprises an amine compound, a polyamine, a polyamide, or a mixture thereof. Tertiary amines are preferred amine compounds. Suitable amine catalysts include, for example, 1,4-diazabicyclo[2.2.2]octane, 2,4,6-tris(dimethylaminomethyl)phenol (e.g., "DMP-30"), 4-dimethylaminopyridine, N,N-dimethylbenzylamine, (4-dimethylamino-methyl)phenol, (2-dimethylaminomethyl)phenol, 2,4,6-tris(4-morpholinylmethyl)phenol, 1,3,5-tris(3-(dimethylamino)propyl)hexahydro-s-triazine (e.g., POLYCAT® 41 from Air Products or JEFFCAT® TR-90 from Huntsman), and the like, and mixtures thereof.

The amount of Lewis acid or base catalyst needed for good curing will depend on many factors that are within the skilled person's discretion, including the nature of the polyepoxide compound, the nature of the polyol composition, the particular catalyst selected, the kind of ssPCM product, the desired transition temperature, the product dimensions, the reaction temperature, the desired pot life, and other factors. Generally, however, the amount of catalyst will be within the range of 0.01 to 10 wt. %, or 0.1 to 8 wt. %, or 1 to 5 wt. % based on the amount of PEEP composition produced.

The low-temperature process is performed at a temperature within the range of 0° C. to 40° C., or 10° C. to 30° C., or in many cases, at room temperature.

In some aspects, it may be desirable to post-cure a product made by the low-temperature process at room temperature or elevated temperature (e.g., 50° C. to 150° C.) with or without control of relative humidity to more rapidly achieve ultimate properties. In general, when a Lewis acid catalyst is used, the post-cure can be accomplished at either room temperature or elevated temperature. When a base catalyst is used, an elevated temperature post-cure is more desirable.

2. Elevated-Temperature (40° C. to 100° C.) Process

An elevated-temperature process can also be used to produce the PEEP composition. Such a process comprises heating, at a temperature within the range of 40° C. to 100° C., a mixture comprising a polyepoxide compound and the polyol composition.

The elevated-temperature process can be performed with or without a catalyst. Suitable catalysts include the Lewis acid catalysts and base catalysts described earlier.

In some aspects, the mixture comprising the polyepoxide compound and the polyol composition is heated at a temperature within the range of 60° C. to 90° C., or 65° C. to 80° C.

In some aspects, it may be desirable to post-cure a product made by the elevated-temperature process at room temperature or elevated temperature (e.g., 50° C. to 150° C.) with or without control of relative humidity to more rapidly achieve ultimate properties. In general, when a Lewis acid catalyst is used, the post-cure can be accomplished at either room temperature or elevated temperature. When a base catalyst is used, an elevated temperature post-cure is more desirable.

The following examples merely illustrate the invention; the skilled person will recognize many variations that are within the spirit of the invention and scope of the claims.

Formulation Components

EPON® 828 (Hexion Specialty Chemicals): a liquid bisphenol A diglycidyl ether-based epoxy resin. Ave. eq. wt.: 189. Viscosity: 13,000 cP at 25° C.
EPALLOY® 5001 (CVC Thermoset Specialties): accelerated epoxidized hydrogenated bisphenol A. Ave. eq. wt.: 200 g/eq.
EPALLOY® 8280 (CVC Thermoset Specialties): epoxy phenol novolac resin. Ave. eq. wt.: 175 g/eq. Nominal functionality: 2.8.
ERISYS™ GE-30 (CVC Thermoset Specialties): trimethylolpropane triglycidyl ether. Ave. eq. wt.: 142 g/eq.
ERISYS™ RN-3650 (CVC Thermoset Specialties): resorcinol/phenol novolac epoxy resin. Ave. eq. wt.: 148 g/eq.
PEG 8000 (Sigma-Aldrich): polyethylene glycol. Hydroxyl number: 14 mg KOH/g.
PEG 4000 (Sigma-Aldrich): polyethylene glycol. Hydroxyl number: 28 mg KOH/g.
PEG 2000 (Sigma-Aldrich): polyethylene glycol. Hydroxyl number: 56 mg KOH/g.
PEG 1000 (Sigma-Aldrich): polyethylene glycol. Hydroxyl number: 112 mg KOH/g.
PTMEG® 2900 (Invista): Poly(tetrahydrofuran) diol. Hydroxyl number: 39 mg KOH/g. Nominal functionality: 2.0.
STEPANPOL® PC-205P-20 (Stepan Company): aliphatic polyester polyol. Hydroxyl number: 18 mg KOH/g. Nominal functionality: 2.0.
STEPANPOL® PC-105-10 (Stepan Company): aliphatic polyester polyol. Hydroxyl number: 10 mg KOH/g. Nominal functionality: 2.0.
LEECURE® B-610 (Leepoxy Plastics, Inc.): boron trifluoride-based catalyst.
LEECURE® B-1310 (Leepoxy Plastics, Inc.): boron trifluoride-based catalyst.

Preparation of PEEP Compositions—Representative Procedure

Example 2

PEG 8000 (13 g, Sigma-Aldrich) is mixed rapidly at room temperature with EPON® 828 resin (3.26 g, product of Hexion Specialty Chemicals) and LEECURE® B-610 catalyst (0.1 g, product of Leepoxy Plastics). The ratio of epoxy to hydroxyl equivalents (epoxy/OH eq. ratio) is 5.3. The mixture is clear after a few seconds. Mixing continues for 30 s. The material is poured into a mold and cured overnight at room temperature or for 5 h at 70° C. Upon DSC measurement at a heating/cooling rate of 10° C. per minute, the material undergoes a solid-to-solid transition. Peak heat release temp.: −2.2° C.; peak heat absorption temp.: 34° C. Transition temperature: 16° C. Latent heat: 51 J/s. Thermal behavior is reproducible over at least 5 cycles (see FIG. 1).

Examples 4, 6-13 and 17-19 and Comparative Examples 3, 5 and 14-16

The procedure of Example 2 is generally followed using an epoxy compound and a polyether or polyester polyol (see Table 1). Properties of the resulting reaction products are given in Table 1.

Each inventive example exhibits a solid-to-solid phase change without significant supercooling. Some comparative examples exhibit a phase change from solid to liquid (Comparative Example 1, PEG 8000 only as a control) or from solid to gel (Comparative Examples 3 and 5). By "gel," we mean a viscous, semi-solid material that would require containment if it were used as a PCM. While Comparative Examples 3 and 5 show that the formulation may require adjustment to avoid a solid-to-gel phase change, Example 17 demonstrates that a low epoxy/hydroxyl ratio of 2.6 can be used successfully. Other comparative examples have no phase transition (Comparative Example 15) or solid-to-solid transitions accompanied by undesirable supercooling (Comparative Examples 14 and 16).

As shown in Table 1, the hydroxyl number of the polyol should be less than 35 mg KOH/g to provide a desirable solid-to-solid phase change. The PEEP compositions that we previously reported as useful for adhesives, coatings, and elastomers generally had higher hydroxyl numbers. Transition temperatures for these illustrations of inventive compositions ranged from about 15° C. to about 50° C., with latent heats ranging from about 40 J/g to about 100 J/g.

TABLE 1

Phase-Change Materials from Polyol-Epoxide Polymers

| Ex | Polyol [1, 2] | Amt, g | OH # | Polyol mp, ° C. | Epoxy cpd.[3] | Amt, g | Epoxy/ OH | Cat.[4] | Amt, g | Oven cure? | Phase change[5] | Transition temp (° C.) | Latent heat, J/s |
|---|---|---|---|---|---|---|---|---|---|---|---|---|---|
| C1 | PEG 8000 | | 14 | 55-62 | — | — | — | — | — | — | S-L | 51 | 177 |
| 2 | PEG 8000 | 13 | 14 | 55-62 | EPON 828 | 3.3 | 5.3 | 610 | 0.1 | N | S-S | 16 | 51 |
| C3 | PEG 8000 | 13 | 14 | 55-62 | EPON 828 | 1.6 | 2.6 | 610 | 0.1 | N | S-G | — | — |
| 4 | PEG 8000 | 13 | 14 | 55-62 | ERISYS GE-30 | 2.5 | 5.3 | 610 | 0.1 | N | S-S | 41 | 83 |
| C5 | PEG 8000 | 20 | 14 | 55-62 | ERISYS GE-30 | 1.9 | 2.6 | 1310 | 0.1 | N | S-G | 40 | 111 |
| 6 | PEG 8000 | 80 | 14 | 55-62 | ERISYS GE-30 | 11.4 | 4.0 | 1310 | 4.0 | N | S-S | 38 | 84 |
| 7 | PEG 8000 | 80 | 14 | 55-62 | ERISYS GE-30 | 11.4 | 4.0 | 1310 | 4.0 | Y | S-S | 37 | 76 |
| 8 | PEG 8000 | 80 | 14 | 55-62 | EPON 828 | 18.7 | 5.0 | 1310 | 4.0 | Y | S-S | 24 | 44 |
| 9 | PEG 8000 | 80 | 14 | 55-62 | EPALLOY 5001 | 21.2 | 5.3 | 1310 | 4.0 | Y | S-S | 34 | 66 |
| 10 | PEG 8000 | 80 | 14 | 55-62 | ERISYS RN-3650 | 15.8 | 5.3 | 1310 | 4.0 | Y | S-S | 18 | 48 |

TABLE 1-continued

Phase-Change Materials from Polyol-Epoxide Polymers

| Ex | Polyol [1, 2] | Amt, g | OH # | Polyol mp, ° C. | Epoxy cpd.[3] | Amt, g | Epoxy/OH | Cat.[4] | Amt, g | Oven cure? | Phase change[5] | Transition temp (° C.) | Latent heat, J/s |
|---|---|---|---|---|---|---|---|---|---|---|---|---|---|
| 11 | PEG 8000 | 80 | 14 | 55-62 | EPALLOY 8280 | 18.7 | 5.3 | 1310 | 4.0 | Y | S-S | 22 | 54 |
| 12 | PEG 8000 | 80 | 14 | 55-62 | ERISYS GE-30 | 9.1 | 3.2 | 1310 | 4.0 | Y | S-S | 39 | 94 |
| 13 | PEG 4000 | 80 | 28 | 53-59 | ERISYS GE-30 | 18.4 | 3.2 | 1310 | 4.0 | Y | S-S | 28 | 60 |
| C14 | PEG 2000 | 80 | 56 | 52-56 | ERISYS GE-30 | 36.9 | 3.2 | 1310 | 4.0 | Y | S-S, SC | — | — |
| C15 | PEG 1000 | 80 | 112 | 37-40 | ERISYS GE-30 | 72.6 | 3.2 | 1310 | 4.0 | Y | rubbery* | — | — |
| C16 | PTMEG 2900 | 80 | 39 | 30-43 | ERISYS GE-30 | 25.0 | 3.2 | 1310 | 4.0 | Y | S-S, SC | 7 | 35 |
| 17 | PC 205P-20 | 10 | 20 | 50-58 | ERISYS GE-30 | 1.2 | 2.6 | 1310 | 0.1 | N | S-S | 47 | 67 |
| 18 | PC 205P-20 | 80 | 20 | 50-58 | ERISYS GE-30 | 21.1 | 5.3 | 1310 | 4.0 | Y | S-S | 34 | 49 |
| 19 | PC 105-10 | 80 | 10 | 40-60 | ERISYS GE-30 | 10.2 | 5.3 | 1310 | 4.0 | Y | S-S | 49 | 60 |

[1] PEG 8000, PEG 2000, PEG 4000, and PEG 1000, polyethylene glycols, supplied by Sigma-Aldrich; PTMEG 2900, product of Invista.
[2] STEPANPOL ® PC 205P-20 and STEPANPOL ® PC 105-10, aliphatic polyester polyols, products of Stepan Company.
[3] EPON ® 828, product of Hexion Specialty Chemicals; EPALLOY ® 8280, EPALLOY ® 5001, ERISYS ™ GE-30, and ERISYS ™ RN-3650 are products of CVC Thermoset Specialties.
[4] LEECURE ® B-610 and LEECURE ® B-1310 are boron trifluoride-based catalysts, products of Leepoxy Plastics, Inc.
[5] Phase change: S-L: solid-to-liquid transition. S-G: solid-to-sticky gel transition. S-S: solid-to-solid transition with no supercooling; S-S, SC: solid-to-solid transition with supercooling.
*no phase change observed.

The preceding examples are meant only as illustrations; the following claims define the inventive subject matter.

We claim:

1. A polyether- or polyester-epoxide polymer (PEEP) composition which comprises a reaction product of:
   (a) a polyepoxide compound having an equivalent weight within the range of 115 to 250 g/eq.; and
   (b) a polyol composition comprising a polyether polyol, a polyester polyol, or a mixture thereof, wherein the polyol composition has a melting point within the range of 20° C. to 100° C. and a hydroxyl number less than 35 mg KOH/g;
   wherein the ratio of epoxy equivalents of the polyepoxide compound to hydroxyl equivalents of the polyol composition is within the range of 2:1 to 6:1; and
   wherein the PEEP composition is a solid-solid phase-change material having, as measured by differential scanning calorimetry (DSC) at a heating/cooling rate of 10° C./minute, a transition temperature within the range of 15° C. to 50° C., a latent heat at the transition temperature within the range of 30 to 200 J/g, and little or no detectable hysteresis or supercooling upon thermal cycling over at least five heating/cooling cycles that encompass the transition temperature wherein the little or no detectable hysteresis or supercooling is evidenced by a variation in transition temperature in any heating or cooling transition of less than 2° C. over the at least five cycles.

2. The PEEP composition of claim 1 wherein the polyol composition comprises a polyethylene glycol having a number-average molecular weight within the range of 3,000 to 10,000 g/mol.

3. The PEEP composition of claim 1 wherein the polyol composition comprises an aliphatic polyester polyol.

4. The PEEP composition of claim 1 wherein the polyol composition has a melting point within the range of 30° C. to 65° C.

5. The PEEP composition of claim 1 wherein the polyol composition has a hydroxyl number within the range of 10 to 30 mg KOH/g.

6. The PEEP composition of claim 1 wherein the ratio of epoxy equivalents of the polyepoxide compound to hydroxyl equivalents of the polyol composition is within the range of 2.5:1 to 5.5:1.

7. The PEEP composition of claim 1 having a transition temperature within the range of 20° C. to 40° C.

8. The PEEP composition of claim 1 wherein the polyol composition has an average hydroxyl functionality within the range of 1.5 to 4.0.

9. The PEEP composition of claim 1 having a latent heat at the transition temperature within the range of 35 to 150 J/g.

10. An automotive or building product comprising the PEEP composition of claim 1.

11. A rigid polyurethane or polyisocyanurate foam comprising the PEEP composition of claim 1.

12. An appliance comprising the foam of claim 11.

13. A composite comprising one or more layers of a rigid polyurethane or polyisocyanurate foam and one or more layers comprising the PEEP composition of claim 1.

14. A flexible polyurethane foam comprising the PEEP composition of claim 1.

15. A textile or garment comprising the PEEP composition of claim 1.

16. A computer, cell phone, tablet, television, stereo, game system, or other electronic device comprising the PEEP composition of claim 1.

17. A method comprising incorporating into an appliance, automotive part, or building material the solid-solid phase-change material of claim 1.

18. A paint or coating comprising the PEEP composition of claim 1.

* * * * *